United States Patent [19]

van Dijk

[11] 3,913,430
[45] Oct. 21, 1975

[54] DEVICE FOR CUTTING RINGS FROM A HOLLOW, THIN-WALLED AND ELONGATE CYLINDRICAL OBJECT

[75] Inventor: Cornelis Dionysius van Dijk, Eindhoven, Netherlands

[73] Assignee: U.S. Philips Corporation, New York, N.Y.

[22] Filed: Sept. 26, 1974

[21] Appl. No.: 509,470

[30] Foreign Application Priority Data
Oct. 3, 1973   Netherlands ....................... 7313574

[52] U.S. Cl. ....................................... 82/82; 82/101
[51] Int. Cl.² ........................................ B23D 21/04
[58] Field of Search ................................ 82/82, 101

[56] References Cited
UNITED STATES PATENTS
1,807,671   6/1931   Phelps ................................. 82/82 X
3,359,841   12/1967   Cvacho et al. .......................... 82/82
3,534,644   10/1970   Germiat et al. ......................... 82/82

Primary Examiner—Leonidas Vlachos
Attorney, Agent, or Firm—Frank R. Trifari; David R. Treacy

[57] ABSTRACT

A device for cutting rings from a hollow, cylindrical object, comprising an annular die in which a rotatable cutting head is arranged. The cutting head supports one or more cutting rollers which are journalled with axial play in a radially movable slide. The cutting edges of the cutting rollers cooperate with the die and are forced away from the die by spring means. A guide body is provided which can bear on the side of the die and which supports a guide along which the cutting rollers or parts connected thereto can roll down. This guide is positioned such that the desired cutting clearance remains between the cutting edge of the cutting rollers and the die.

3 Claims, 2 Drawing Figures

DEVICE FOR CUTTING RINGS FROM A HOLLOW, THIN-WALLED AND ELONGATE CYLINDRICAL OBJECT

The invention relates to a device for cutting rings from a hollow, thin-walled and elongate cylindrical object.

For cutting rings from a hollow cylindrical object use can be made, for example, of a tube cutting machine in which a number of cutting rollers are pressed against the tube from the outside. Also known are machines in which rollers are pressed against the tube from the inside. A drawback of these machines, however, is that the accuracy of the cutting face of the rings thus obtained cannot be very high because the cutting clearance, that is to say the clearance between the cutting rollers and a counter-die, does not remain constant within a few hundredths of a millimeter.

The invention has for its object to provide a device by means of which rings can be cut with a very high cutting clearance accuracy.

To this end, the device according to the invention is characterized in that it comprises an annular die which is arranged in a frame, the die having arranged thereinside a cutting head which is journalled to be rotatable on a shaft which is coaxially arranged with respect to the die and which is connected at a distance therefrom to the frame, the cutting head supporting one or more cutting rollers, each of which is journalled to be rotatable with axial play in a slide, each slide being radially movable in the cutting head, the cutting edge of the said cutting rollers cooperating with a cutting edge of the die and being forced away from this cutting edge by spring means, the frame being adapted to accommodate the cylindrical body and means being provided for sliding the body along the die, a guide body being provided which can bear on the side of the die and which is provided with a guide along which the rollers or parts connected thereto can roll down, the guide being positioned such that the desired cutting clearance between the cutting edge of the cutting rollers and the die, remains.

The device is thus obtained by means of which rings can be very accurately cut to the required dimensions with a very accurate cutting clearance.

A major aspect of this device is that herein the cutting roller does not bear on the frame only via the long way of its shaft, the slide, the cutting head and the cutting head shaft, so that the cutting roller would be suspended in a void as if it were.

If such a suspension is used, inaccuracies can readily occur because of temperature differences, bending of the frame, shaft etc., bearing play, tolerances and the construction thereof, and shrinkage of the material.

In the device according to the invention, however, the cutting rollers are guided by a guide which bears directly on the die so that the cutting rollers are always in a fixed, very accurate relationship with the die side. This guarantees a cutting clearance of substantially constant dimensions. In a further preferred embodiment of the device according to the invention the relevant guide is formed by a guide edge provided on the guide body, the guide body being provided with a number of pins by way of which the guide body can bear on the die.

In another preferred embodiment yet, the guide is formed by a slot provided in the guide body, each of the cutting rollers being provided with a flange which can roll down in the slot.

This illustrates that the guiding of the cutting rollers can be effected in a variety of ways which are all characterized in that the cutting clearance is kept constant by making the cutting rollers bear on the die according to the shortest path.

The invention will be described in detail hereinafter with reference to the drawing.

Figure 1:
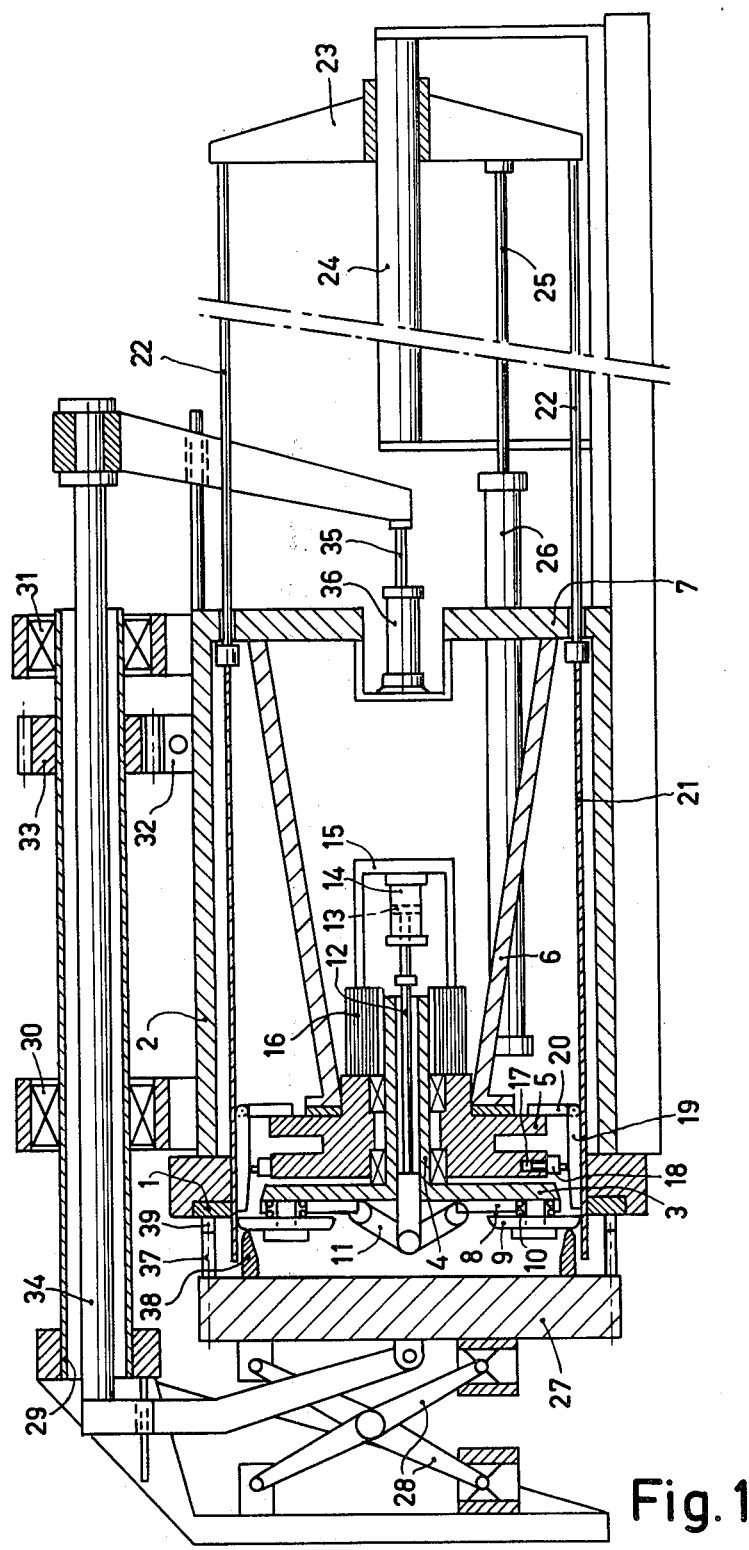
FIG. 1 is a diagrammatic axial sectional view (not to scale) of a device for cutting rings.

The drawing shows a sectional view of a machine for cutting rings from a tubular body.

The reference 1 therein denotes a round die which is accommodated in a frame 2.

Arranged in the die is a cutting head 3, the shaft 4 thereof being journalled to be rotatable in the structural part 5 which is rigidly connected, by way of the part 6, to the rear face 7 of the frame 2.

The cutting head 3 comprises two radially movable slides 8, a cutting roller 9 being journalled to be rotatable with axial clearance in each slide. A spring 10 exerts a spring force to the left on each of the cutting rollers.

Each of the slides 8 is connected, by way of a lever 11, to a rod 12 which is coupled to the piston 13 of an hydraulic cylinder 14.

The hydraulic cylinder 14 is connected to a frame 15 which in turn is connected to the housing of an hydraulic rotary motor 16, the rotor of which is coupled to the shaft 4 of the cutting head, the housing of the said motor being connected to the structural part 5.

Cylindrical recesses are provided at regular intervals along the circumference of the structural part 5, it being possible to apply hydraulic pressure liquid to said recesses, via ducts not shown, for the outward movement of the pistons 18, each of which is connected to a lever 19 which in turn is pivotably connected to part 20 which is connected to part 5.

The outward movement of the pistons 18 causes an outward movement of the lever 19, the cylindrical body 21 to be cut being pressed against the die 1.

Bearing on the right-hand end of the cylindrical body are a number of rods 22 which are connected to a yoke 23 which is journalled to be slidable on a shaft 24. The yoke 23 has connected thereto a piston rod 25 of a pneumatic cylinder 26. The yoke 23 can thus be slid, the cylindrical body 21 then sliding along.

The device furthermore comprises a guide plate 27 which is suspended, via a lever guide 28, from a rotatable hollow shaft 29 which is journalled to be rotatable at the area 30,31.

A rack 32, cooperating with a gearwheel 33 mounted on the shaft 29, is capable of providing the rotation of the shaft 29 and hence the turning away of the plate 27, so that a new tube 21 can be inserted in this position.

Also coupled to the plate 27 is a draw bar 34 which is passed through the hollow shaft 29, the other end of the said draw bar being connected to the piston rod 35 of the hydraulic cylinder motor 36.

The plate 27 is provided with a number of pins 37 and a guide edge 38.

The die 1 is provided with a number of pins 39 in locations corresponding to those of the pins 37.

The length of the pins 39 corresponds to the thickness of the cutting rollers 9.

The length of the pins 37 equals the height of the guide edge 38 plus the dimension of the desired cutting clearance.

Consequently, when the plate 27 is pressed, the pins 37 engage the pins 39. The distance between the guide edge 38 and the die 1 is thus exactly determined. The guide edge 38 presses the cutting rollers 9 inwards against the force of the spring 10 so far that the desired cutting clearance between the cutting rollers 9 and the die 1 is exactly obtained. During cutting, the cutting rollers 9 roll along the guide edge 38 during this process the dimension of the cutting clearance is accurately maintained. It is very difficult for deformation to occur because the cutting rollers bear on the die via the shortest possible path. This ensures that rings can be manufactured with a very high dimensional accuracy. This is very important, for example, for shrink rings for television display tubes.

Figure 2:
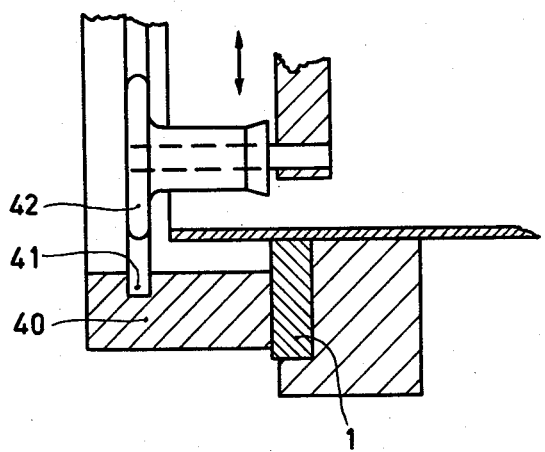
FIG. 2 shows another embodiment of a part of FIG. 1, i.e. the guide for the cutting rollers.

Another method of guiding the cutting rollers is diagrammatically shown in FIG. 2. A guide edge 40 is rigidly mounted on the die 1. This guide edge 40 is provided with a guide slot 41 in which a flange 42, connected to each of the cutting rollers, is guided. Very accurate guiding of the cutting rollers in an edge which is rigidly connected to the die is thus again achieved, and hence also a constant cutting clearance width.

What is claimed is:

1. A device for cutting rings from a hollow, thin-walled and elongate cylindrical object, comprising a frame, an annular die arranged in the frame, and having a cutting edge, a shaft connected to the frame at a distance from said die and coaxially with respect to the die, a cutting head journalled to be rotatable on the shaft, a number of slides, a corresponding number of cutting rollers each having a cutting edge, the cutting head supporting said cutting rollers, each of which is journalled to be rotatable with axial play in a respective slide, each slide being radially movable in the cutting head, the cutting edge of the said cutting rollers cooperating with a cutting edge of the die, spring means for biasing a cutting roller away from the die cutting edge, means for accommodating the cylindrical object within the frame and for sliding the object along the die, a guide having means for bearing on a side of the die and means for guiding said rollers, the guide being positioned such that a desired cutting clearance is obtained between the cutting edge of the cutting rollers and the die.

2. A device as claimed in claim 1, wherein the guiding means comprises a guide edge on a guide body, and said bearing means comprises a number of pins extending from the guide body to bear against the side of the die.

3. A device as claimed in claim 1, wherein said guiding means comprises a slot in a guiding body, each of the cutting rollers having a flange disposed for rolling engagement in the slot.

* * * * *